(12) United States Patent
Theile et al.

(10) Patent No.: US 11,379,923 B1
(45) Date of Patent: Jul. 5, 2022

(54) SYSTEM AND METHOD FOR REAL-TIME SCREENING OF A DISABILITY INSURANCE APPLICANT

(71) Applicant: STATE FARM MUTUAL AUTOMOBILE INSURANCE COMPANY, Bloomington, IL (US)

(72) Inventors: David A. Theile, Bloomington, IL (US); John David Diffor, Bloomington, IL (US); David Scott Etheridge, Bloomington, IL (US); Eloy Garcia, Bloomington, IL (US); Jeffrey M. Prall, Normal, IL (US); Jeffrey A. Newman, Bloomington, IL (US); Robert Benjamin, Normal, IL (US); Randall Petersen, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 50 days.

(21) Appl. No.: 16/924,317

(22) Filed: Jul. 9, 2020

Related U.S. Application Data (63) Continuation of application No. 15/479,980, filed on Apr. 5, 2017.

(60) Provisional application No. 62/347,158, filed on Jun. 8, 2016, provisional application No. 62/327,491, filed on Apr. 26, 2016.

(51) Int. Cl.
*G06Q 40/08* (2012.01)

(52) U.S. Cl.
CPC .................... *G06Q 40/08* (2013.01)

(58) Field of Classification Search
CPC ...................................................... G06Q 40/08
See application file for complete search history.

(56) References Cited

U.S. PATENT DOCUMENTS

| | | | |
|---|---|---|---|
| 7,831,451 B1* | 11/2010 | Morse | G16H 50/30 705/4 |
| 2014/0188518 A1* | 7/2014 | Wise | G06Q 40/08 705/3 |
| 2016/0003819 A1* | 1/2016 | Curran | G01N 33/576 506/9 |

* cited by examiner

*Primary Examiner* — Scott C Anderson
*Assistant Examiner* — Marla Hudson
(74) *Attorney, Agent, or Firm* — Faegre Drinker Biddle & Reath (57) ABSTRACT

A system and method for automatically screening applicants for disability insurance in real-time, and if the results are favorable, automatically communicating acceptances and issuing policies via wireless communication. An applicant's BMI is calculated, and the applicant is rejected if the BMI is too high or low. The applicant's prescription drug history is obtained, and the applicant is rejected if the history shows use of a drug associated with a serious medical condition. The acceptance or rejection and a premium for the insurance product may be set based upon the real-time screening results and communicated to the applicant. Additionally, an occupation class assigned to the applicant may be confirmed, a motor vehicle report for the applicant may be obtained, and an insurance information report for the applicant may be obtained. If the applicant is rejected, they may be allowed to apply for the insurance product using an alternate non-real-time process.

19 Claims, 3 Drawing Sheets

SYSTEM AND METHOD FOR REAL-TIME SCREENING OF A DISABILITY INSURANCE APPLICANT

RELATED APPLICATION

The present U.S. non-provisional patent application is a continuation of and claims priority benefit of U.S. non-provisional patent application Ser. No. 15/479,980, which is related to and claims priority benefit of prior-filed U.S. provisional patent applications having the same title, Ser. No. 62/327,491, filed Apr. 26, 2016, and Ser. No. 62/347,158, filed Jun. 8, 2016. The entire contents of the identified earlier-filed applications are hereby incorporated by reference into the present application as if fully set forth herein.

FIELD OF THE DISCLOSURE

The present disclosure generally relates to systems and methods for facilitating screening of applicants for disability insurance, and more particularly, to a system and computer-implemented method for automatically screening applicants for disability insurance in real-time, and if the results are favorable, automatically communicating acceptances and issuing policies.

BACKGROUND

Many people desire to purchase disability insurance in order to ensure that their monthly financial obligations (especially with regard to, e.g., housing and vehicles payments) will be met if they become disabled and suffer a loss of income. According to one estimate, 26% of people own disability insurance, and 90% of them are between the ages of 25 and 64 years. Applicants for disability insurance may be employed in blue or white collar occupations, and may seek short-term or long-term coverage. However, existing processes for screening applicants for disability insurance and making coverage decisions may be cumbersome, especially for applicants with no or few risk factors for rejection but whose applications may be nevertheless subjected to full underwriting to assess their suitability. Further, existing processes may require insurance agents to classify the occupations of applicants, and mistakes may be made in such classifications that may delay coverage decisions and/or may result in incorrect acceptance or non-acceptance.

BRIEF SUMMARY

Embodiments of the present technology relate to systems and computer-implemented methods for automatically screening applicants for disability insurance in real-time, and if the results are favorable, automatically communicating acceptances and issuing policies.

In a first aspect, a computer-implemented method may be provided for real-time screening of an applicant for an insurance product. The computer-implemented method may include at least the following performed by an electronic processing element. A plurality of application answers may be received from the applicant via an electronic communications network. The application answers may include a height of the applicant, a weight of the applicant, an identifier for the applicant, and/or an occupation of the applicant. A body mass index number of the applicant may be calculated based upon the height of the applicant and the weight of the applicant, and the applicant may be rejected if their body mass index is below a minimum or above a maximum threshold. A prescription drug history of the applicant may be obtained based upon the identifier for the applicant, and the applicant may be rejected if the prescription drug history shows that the applicant uses one or more of specific drugs. The applicant may be accepted or rejected and a premium for the insurance product may be set based upon the real-time screening results, and the acceptance and the premium or the rejection may be communicated to the applicant via the electronic communications network. As a result, an instant answer and/or online binding disability product (i.e., a product that is bound online via virtual activity) may be provided to online customers, and/or the online customer experience may be enhanced. The method may include additional, less, or alternate actions, including those discussed elsewhere herein, and may be implemented via one or more local or remote processors and/or transceivers, and/or computer-executable instructions stored on non-transitory computer-readable medium or media.

In a second aspect, a computer system may be provided for real-time screening of an applicant for an insurance product. The system may comprise an electronic communications element configured to communicate via an electronic communications network, and an electronic processing element configured to perform at least the following. A plurality of application answers may be received from the applicant via the electronic communications element. The application answers may include a height of the applicant, a weight of the applicant, an identifier for the applicant, and/or an occupation of the applicant. A body mass index number of the applicant may be calculated based upon the height of the applicant and the weight of the applicant, and the applicant may be rejected if their body mass index is below a minimum or above a maximum threshold. A prescription drug history of the applicant may be obtained based upon the identifier for the applicant, and the applicant may be rejected if the prescription drug history shows that the applicant uses one or more specific drugs. The applicant may be accepted or rejected and a premium for the insurance product may be set based upon the real-time screening results, and the acceptance and the premium or the rejection may be communicated to the applicant via the electronic communications element. As a result, an online applicant may be provided with a disability insurance product that is bound online, and the online customer experience may be enhanced. The computer system may be implemented one or more local or remote processors, transceivers, servers, and/or sensors, and may include additional, less, or alternate functionality, including that discussed elsewhere herein.

In a third aspect, a non-transitory computer-readable medium with an executable program stored thereon may be provided for real-time screening of an applicant for an insurance product. The computer program may be configured to instruct an electronic processing element to perform at least the following actions. A plurality of application answers from the applicant may be received via an electronic communications network. The application answers may include a height of the applicant, a weight of the applicant, an identifier for the applicant, and/or an occupation of the applicant. A body mass index number of the applicant may be calculated based upon the height of the applicant and the weight of the applicant, and the applicant may be rejected if their body mass index is below a minimum or above a maximum threshold. A prescription drug history of the applicant may be obtained based upon the identifier for the applicant, and the applicant may be rejected if the prescription drug history shows that the applicant uses one or more specific drugs. The applicant may be accepted or rejected a premium for the insurance product may be set based upon the real-time screening results, and the acceptance and the premium or the rejection may be communicated to the applicant via the electronic communications network. As a result, instant answer disability insurance products may be provided with immediate online binding. The computer-executable instructions may direct one or more processors to perform additional, less, or alternate functionality or actions, including those discussed elsewhere herein.

Various implementations of any or all of the foregoing aspects may include any one or more of the following additional features. The insurance product may be disability insurance. The plurality of specific drugs may include drugs used to treat serious medical conditions. The electronic processing element may confirm an occupation class assigned to the applicant based upon the occupation of the applicant, and may base the premium for the insurance product at least in part on the confirmed assigned occupation class. The electronic processing element may further obtain a motor vehicle report for the applicant based upon the identifier for the applicant, and may reject the applicant for the insurance product if the motor vehicle report shows that the applicant engages in one or more specific unsafe driving behaviors. The electronic processing element may further obtain an insurance information report for the applicant based upon the identifier for the applicant. This report may contain information on non-medical and medical conditions reported by other members who participate in the insurance information report, which may impact processing of the present products. In one embodiment, a short-term disability product may be provided. Tools use to assess the risk on the short-term disability insurance may include consumer reports or other consumer database information that helps to mitigate anti-selection.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for facilitating real-time screening of applicants for disability insurance, and more particularly, to a system and computer-implemented method for automatically screening applicants for disability insurance in real-time, and if the results are favorable, automatically communicating acceptances and issuing policies.

Certain embodiments may involve receiving an application for disability insurance from an applicant (such as an online or virtual application submitted via an applicant mobile device); automatically or substantially automatically (i.e., processor driven with minimal human interaction) checking one or more particular items which may otherwise not be considered or which may be incorrectly completed; and automatically or substantially automatically making a decision about whether to provide coverage. The one or more particular items which may otherwise not be considered may include a height and/or weight of the applicant, a behavioral inventory and/or medical history of the applicant, and/or a prescription drug usage history of the applicant, and the one or more particular items which may otherwise be incorrectly completed may include a classification of an occupation of the applicant. If the results of the real-time screening process are favorable, then the applicant may be immediately or substantially immediately (i.e., with minimal delay) notified of acceptance and a policy may be automatically or substantially automatically issued and mailed or otherwise communicated to the applicant.

In one implementation, the decision to accept the applicant and the notification of acceptance may be made automatically or substantially automatically by a system and without the involvement of human beings. The decision to accept may be made locally by an applicant mobile device (such as a mobile device running an insurance provider App (application)), or remotely by a remote server associated with the insurance provider (such as after the applicant completes an online or virtual application, and submits it electronically via an applicant mobile device. The online application being transmitted by the mobile device, and then received at an insurance provider remote server via wireless communication or data transmission over one or more radio links or communication channels).

If the results of the real-time screening process are indeterminate or unfavorable (e.g., if the body mass index (BMI) of the applicant is below a minimum threshold or above a maximum threshold, or if the applicant is using a certain prescription drug for a serious health condition), then the applicant may be immediately or substantially immediately notified of a delay, and the application may be subjected to additional consideration which may include additional or full underwriting, or the applicant may be notified of non-acceptance.

In one implementation, the prescription drug usage history of applicants may be obtained from a third-party information service which tracks the issuance and/or filling of prescriptions. The usage of certain prescription drugs, such as antibiotics or cholesterol-lowering drugs, may not result in non-acceptance, while the usage of other prescription drugs, such as human immunodeficiency virus (HIV) drugs or congestive heart failure drugs, may result in non-acceptance. Even if the applicant is asked to identify any prescription drugs they may be using, the third-party information service may still be queried to check the completeness and veracity of the information provided by the applicant.

The occupations of applicants may be numerically classified based upon risk from the perspective of disability insurance. Certain professions (e.g., manual laborer) with a higher risk of disability may be rejected or may be charged a higher premium or may be subject to certain limitations, while other professions (e.g., business person) with a lower risk of disability may not be. Typically, insurance agents classify the occupations of applications, but they sometimes make mistakes. In one implementation of the present invention, the accuracy of the agents' classifications may be automatically or substantially automatically checked to ensure correctness.

Thus, in an exemplary implementation, an applicant may submit an application for disability insurance. The application may be automatically or substantially automatically checked in real-time to determine that the height and weight of the applicant are within specified ranges, to determine that the applicant is not taking certain prescription drugs, to determine that certain other questions regarding any current behaviors or illnesses of the applicant are answered favorably, and/or to check the classification of the occupation of the applicant. If these automatically or substantially automatically performed checks are all favorable, then the applicant may be notified of acceptance and a policy may be mailed or otherwise communicated (text, email, etc.) to the applicant shortly (e.g., within a few days) or even immediately or substantially immediately.

Additionally or alternatively, the real-time screening process may further include automatically or substantially automatically obtaining and considering a motor vehicle report detailing motor vehicle violations associated with the applicant. In particular, the application may be rejected if the applicant engages in one or more specific unsafe driving behaviors (e.g., speeding, reckless driving, running red lights or stop signs). The motor vehicle report may be obtained from the state in which the applicant resides or from a third-party information service.

Additionally or alternatively, the real-time screening process may further include automatically or substantially automatically obtaining and considering an insurance report detailing any insurances (e.g., health, life, disability) applied for by the applicant. The insurance report may be obtained from a third-party information service.

Additionally or alternatively, the real-time screening process may further include automatically or substantially automatically obtaining and considering income and/or tax information associated with the applicant and considering the income and/or tax information when accepting or rejecting the applicant for the insurance product and/or setting the premium. This may be provided in the form of, e.g., a W2 and/or or a tax return.

Broadly, the application for disability insurance may be completed in electronic form or may be completed in pen-and-paper form and then scanned and electronically transmitted via an electronic communications network to the insurance provider. The disability insurance may be bundled with other insurance and financial products or services. For instance, the disability insurance may be directed to any one or more of mortgage, rent, or credit disability, and may include or be associated with any one or more of disability, health, auto, fire, life, renters, homeowners, or personal insurance, and/or other insurance or financial services or products.

Thus, it will be appreciated that the various embodiments and implementations may provide several advantages over existing processes for applying for disability insurance, including making the process quicker and more efficient, especially for applicants with no or few risk factors for rejection but whose applications are nevertheless typically subjected to full underwriting to assess their suitability. Further, the various embodiments and implementations may check certain information, such as agents' classifications of applicants' occupations, which may reduce delays in making coverage decisions and reduce risks of making incorrect acceptances and non-acceptances.

I. Exemplary System

Figure 1:
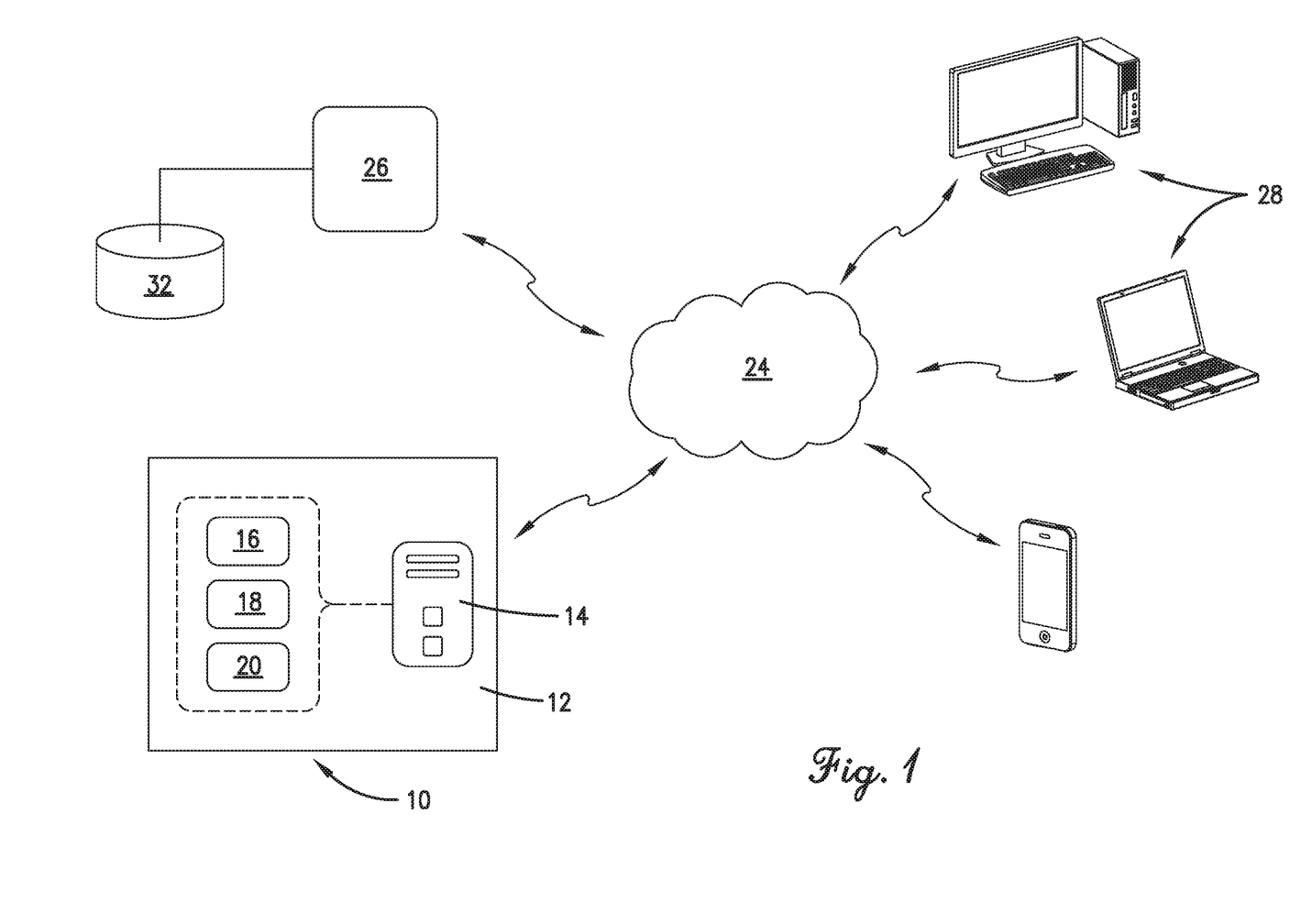
FIG. 1 is a depiction of an embodiment of an exemplary system for real-time screening of an applicant for an insurance product, wherein the system is shown in an exemplary operational environment.

Referring to FIG. 1, an exemplary embodiment of a computer system 10 is shown for facilitating real-time screening of applicants for disability insurance. The system 10 may include an insurance provider 12 having computing resources 14, which may include an electronic memory element 16, an electronic processing element 18, and/or an electronic communications element 20. An exemplary environment in which the system 10 may operate may include an electronic communications network 24, one or more third-party information providers 26, and various electronic devices 28 with which the applicants for disability insurance may contact the insurance provider 12 via the electronic communications network 24.

The electronic memory element 16 may be configured to store electronic data, including data relevant to the applications for disability insurance. The memory element 16 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The electronic processing element 18 may be configured to execute a computer program, which may involve accessing data stored on the electronic memory element 16 and/or engaging in communication via the electronic communications element 20 in order to screen and/or otherwise process the applications for disability insurance. The electronic communications element 20 may be configured to communicate data relevant to the applications for disability insurance via the electronic communications network 24. The electronic communications element 20 may include one or more transceivers (e.g., WWAN, WLAN, and/or WPAN transceivers) functioning in accordance with IEEE standards, 3GPP standards, or other standards, and configured to receive and transmit data via one or more external ports.

The electronic communications network 24 may facilitate substantially any type of data communications via any standard or technology (e.g., GSM, CDMA, TDMA, WCDMA, LTE, EDGE, OFDM, GPRS, EV-DO, UWB, WiFi, IEEE 802 including Ethernet, WiMAX, and/or others). The electronic communications network 24 may also support various local area networks (LANs), personal area networks (PAN), or short range communications protocols.

The one or more third-party information providers 26 may collect, store in one or more databases 32, and provide information to, e.g., the insurance provider 12 relevant to screening the applications for disability insurance. The third-party information providers and the information they provide may include a medical information service providing medical history and/or prescription drug usage information, a motor vehicle information service providing motor vehicle usage and/or violation information, and/or an insurance information service providing information regarding non-medical and medical conditions reported by other members who participate in the insurance information report.

The various electronic devices 28 with which the applicants for disability insurance may contact the insurance provider 12 via the electronic communications network 24 may include desktop and/or other non-mobile computers, laptop, notebook, and/or other mobile computers, and/or smartphones and/or substantially any other mobile communications devices suitable for this purpose.

Figure 2:
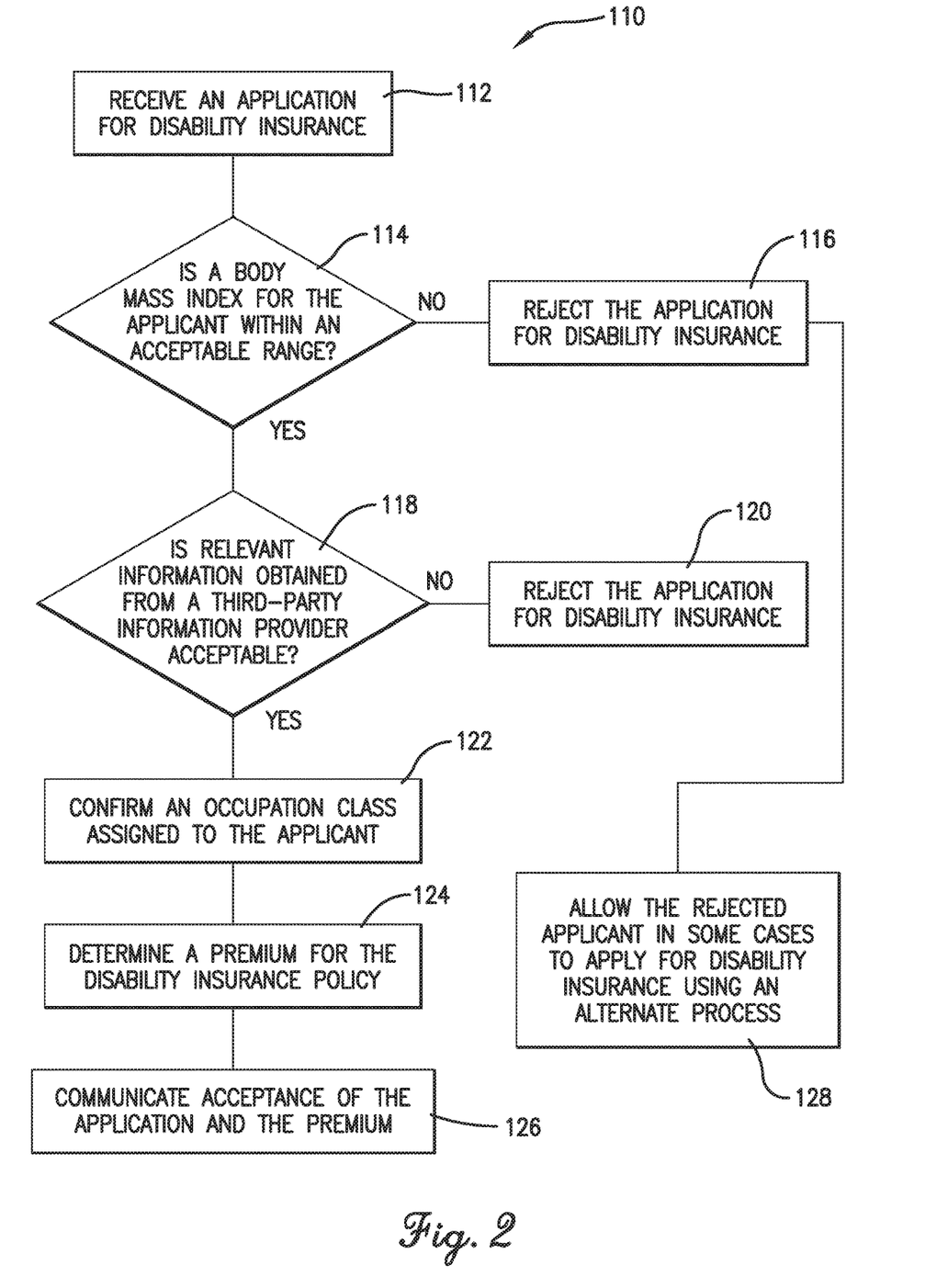
FIG. 2 is a flowchart of an exemplary embodiment of a computer-implemented method for real-time screening of an applicant for an insurance product.

Referring also to FIG. 2, the exemplary computer system 10 may function as follows. An application for disability insurance may be received from an applicant via the electronic communications element 20 and stored in the electronic memory element 16, as shown in 112. The applicant may be requested to answer several "kick out" questions related to medical conditions, such as questions related to cancer, diabetes, liver disease, heart or vascular conditions, lung or respiratory conditions, nervous system conditions, and/or psychological mental conditions. The online or virtual application may be completed on one of the various electronic devices 28, and may include information from the applicant that is relevant to determining whether to accept the application and issue a policy for disability insurance. The information may include a height of the applicant, a weight of the applicant, an identifier for the applicant, an occupation of the applicant, and/or other applicant information.

A BMI number for the applicant may be calculated by the processing element 18 based upon the height and weight of the applicant, as shown in 114, and the applicant may be rejected for the insurance product if the BMI of the applicant is below a minimum threshold or above a maximum threshold, as shown in 116. Additional information relevant to accepting or rejecting the application for disability insurance may be obtained from the one or more third-party information providers 26 based upon the identifier for the applicant, as shown in 118, and the applicant may be rejected for the insurance product if the information is not acceptable, as shown in 120. Further, an occupation class may be assigned to the applicant based upon the occupation of the applicant may be confirmed by the electronic processing element 18, as shown in 122, and a premium may be determined by the electronic processing element 18 for the insurance product based upon the assigned and confirmed occupation class, as shown in 124.

The applicant may be accepted or rejected for the insurance product and the premium for the insurance product may be set based upon the real-time screening results, and the acceptance and the premium or the rejection may be communicated to the applicant via the electronic communications element 20 via the electronic communications network 24 or mailed, as shown in 126. If the applicant is rejected for the insurance product, then the applicant may be allowed to apply for the insurance product using an alternate non-real-time process involving more comprehensive underwriting, as shown in 128.

The system 10 may include more, fewer, or alternative components and/or perform more, fewer, or alternative actions, including those discussed elsewhere herein, and particularly those discussed in the following section describing the computer-implemented method.

II. Exemplary Computer-Implemented Method

Referring again to FIG. 2, an exemplary embodiment of computer-implemented method 110 is shown for facilitating real-time screening of applicants for disability insurance. The computer-implemented method 110 may be a corollary to the functionality of the system 10 of FIG. 1, and may be similarly implemented using the various components of the system 10 within the above-described exemplary operating environment. Broadly, the method 110 may proceed as follows. An online or virtual application for disability insurance may be received from an applicant via the electronic communications element 20 and stored in the electronic memory element 16, as shown in 112. The application may be completed on one of the various electronic devices 28, and may include information from the applicant that is relevant to determining whether to accept the application and issue a policy for disability insurance. The information may include a height of the applicant, a weight of the applicant, an identifier for the applicant (e.g., name, social security number, customer number), and an occupation of the applicant.

A BMI number for the applicant may be calculated by the processing element 18 based upon the height and weight of the applicant, as shown in 114. The applicant may be rejected for the insurance product if the BMI of the applicant is below a minimum threshold or above a maximum threshold, as shown in 116, or accepted if BMI is within a predetermined or other range.

Information relevant to accepting or rejecting the application for disability insurance may be obtained from the one or more third-party information providers 26 based upon the identifier for the applicant, as shown in 118, and the applicant may be rejected for the insurance product if the information is not acceptable (or accepted if the information is acceptable), as shown in 120. For example, a prescription drug history of the applicant may be obtained from the one or more third-party information providers 26 based upon the identifier for the applicant, and the applicant may be rejected for the insurance product if the prescription drug history of the applicant shows that the applicant uses one or more specific drugs. These drugs may include those used to treat serious medical conditions, which might include drugs used to treat HIV or congestive heart failure.

Additionally or alternatively, a motor vehicle report for the applicant may be obtained from the one or more third-party information providers 26 based upon the identifier for the applicant, and the applicant may be rejected for the insurance product if the motor vehicle report for the applicant shows that the applicant engages in unsafe or otherwise problematic driving behavior. Additionally or alternatively, an insurance information report for the applicant may be obtained based upon the identifier for the applicant that provides information regarding non-medical and medical conditions reported by other members who participate in the insurance information report.

Further, an occupation class assigned to the applicant based upon the occupation of the applicant may be confirmed by the electronic processing element 18, as shown in 122, and a premium may be determined by the electronic processing element 18 for the insurance product based upon the assigned and confirmed occupation class, as shown in 124.

The applicant may be accepted or rejected for the insurance product and the premium for the insurance product may be set based upon the real-time screening results, and the acceptance and the premium or the rejection may be communicated to the applicant via the electronic communications element 20 via the electronic communications network 24 or by mail, as shown in 126. If the applicant is rejected for the insurance product by the real-time screening process, then the applicant may be allowed to apply for the insurance product using an alternate non-real-time process involving more comprehensive underwriting, as shown in 128. The computer-implemented method may include more, fewer, or alternative actions, including those discussed elsewhere herein.

III. Exemplary Computer-Readable Medium

Referring again to FIG. 2, an exemplary embodiment of a non-transitory computer-readable medium with an executable computer program stored thereon is shown for facilitating real-time screening of applicants for disability insurance. The non-transitory computer-readable medium with the executable computer program stored thereon may make use of the various components of the system 10 within the above-described exemplary operating environment. The executable program may broadly instruct the various components of the system 10 to perform the method 110 as follows.

An application for disability insurance may be received from an applicant via the electronic communications element 20 and stored in the electronic memory element 16, as shown in 112. The application may be completed on one of the various electronic devices 28, and may include information from the applicant that is relevant to determining whether to accept the application and issue a policy for disability insurance. The information may include a height of the applicant, a weight of the applicant, an identifier for the applicant, and/or an occupation of the applicant.

A BMI number for the applicant may be calculated by the processing element 18 based upon the height and weight of the applicant, as shown in 114, and the applicant may be rejected for the insurance product if the BMI of the applicant is below a minimum threshold or above a maximum threshold, as shown in 116.

Information relevant to accepting or rejecting the application for disability insurance may be obtained from the one or more third-party information providers 26 based upon the identifier for the applicant, as shown in 118, and the applicant may be rejected for the insurance product if the information is not acceptable, as shown in 120. An occupation class assigned to the applicant based upon the occupation of the applicant may be confirmed by the electronic processing element 18, as shown in 122, and a premium may be determined by the electronic processing element 18 for the insurance product based upon the assigned and confirmed occupation class, as shown in 124.

The applicant may be accepted or rejected for the insurance product and the premium for the insurance product may be set based upon the real-time screening results, and the acceptance and the premium or the rejection may be communicated to the applicant via the electronic communications element 20 via the electronic communications network 24 or by mail, as shown in 126. If the applicant is rejected for the insurance product by the real-time screening process, then the applicant may be allowed to apply for the insurance product using an alternate non-real-time process involving more comprehensive underwriting, as shown in 128.

The executable program stored on the non-transitory computer-readable medium may instruct the system to perform more, fewer, or alternative actions, including those discussed elsewhere herein, and particularly those discussed in the section describing the computer-implemented method.

IV. Exemplary Implementation

Figure 3:
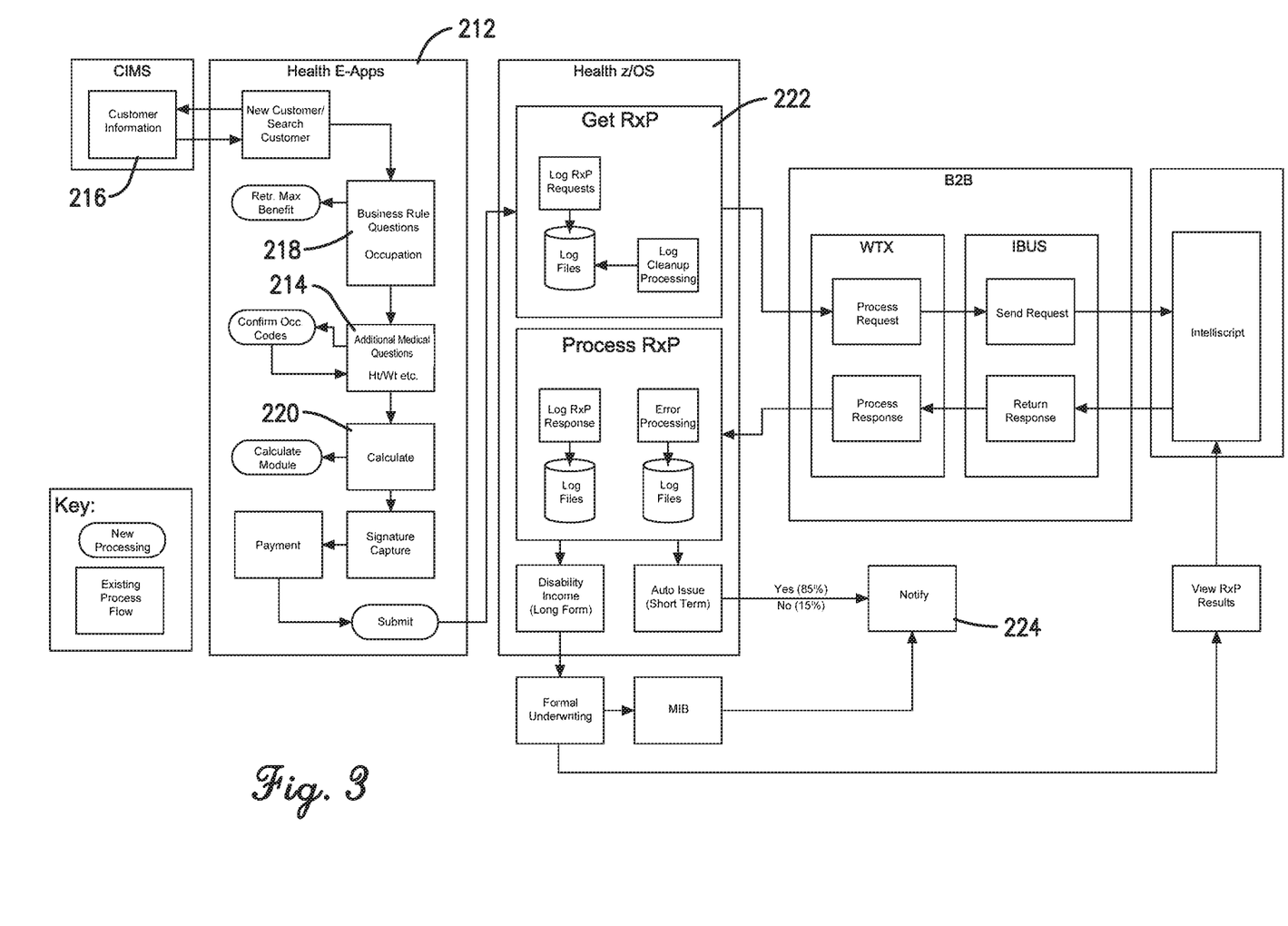
FIG. 3 is a block diagram of an exemplary first implementation of the system and method for real-time screening of an applicant for an insurance product.

Referring to FIG. 3, an exemplary implementation of the foregoing embodiments for facilitating real-time screening of applicants for disability insurance may proceed substantially as follows. An online or virtual application for disability insurance may be received from an applicant via the electronic communications element 20 and stored in the electronic memory element 16, as shown in 212. The application may be completed on one of the various electronic devices 28, and may include information from the applicant that is relevant to determining whether to accept the application and issue a policy for disability insurance. The information may include a height of the applicant (shown in 214), a weight of the applicant (shown in 214), an identifier for the applicant (e.g., name, social security number, customer number) (shown in 216), an occupation of the applicant (shown in 218), and/or other applicant information.

A BMI number for the applicant may be calculated by the processing element 18 based upon the height and weight of the applicant, as shown in 220, and the applicant may be rejected for the insurance product (or "kicked out" of the online flow) if the BMI of the applicant is below a minimum threshold or above a maximum threshold (or allowed to continue within the flow if BMI is within a predetermined range).

Information relevant to accepting or rejecting the application for disability insurance may be obtained from the one or more third-party information providers 26 based upon the identifier for the applicant, as shown in 222, and the applicant may be rejected for the insurance product (or "kicked out" of the flow) if the information is not acceptable. For example, a prescription drug history of the applicant may be obtained from the one or more third-party information providers 26 based upon the identifier for the applicant, and the applicant may be rejected for the insurance product if the prescription drug history of the applicant shows that the applicant uses one or more specific drugs. These drugs may include those used to treat serious medical conditions, which might include drugs used to treat HIV or congestive heart failure.

The applicant may be accepted or rejected for the insurance product and the premium for the insurance product may be set based upon the real-time screening results, and the acceptance and the premium or the rejection may be communicated to the applicant via the electronic communications element 20 via the electronic communications network 24 (such as via wireless communication or data transmission with an applicant mobile device over one or more radio links or wireless communication channels) or by mail, as shown in 224. If the applicant is rejected for the insurance product by the real-time screening process, then the applicant may be allowed to apply for the insurance product using an alternate non-real-time process involving more comprehensive underwriting. Additional exemplary implementations may include more, fewer, or alternative actions, including those discussed elsewhere herein.

V. Exemplary Embodiments

In one aspect, a computer-implemented method for real-time screening of an applicant for disability insurance may be provided. The computer-implemented method may include: (1) receiving, via one or more processors and/or transceivers, a virtual or online application for disability insurance from a user mobile device (via wireless communication or data transmission over one or more radio links or wireless communication channels or networks), the virtual or online application including answers to multiple kick out questions, and an identifier for the applicant; (2) determining, via the one or more processors, whether or not the applicant's answers satisfy all of the multiple kick out questions; (3) if not, via the one or more processors and/or transceivers, transmitting a notification to the applicant's mobile device (via wireless communication or data transmission over one or more radio links or wireless communication channels or networks) notifying the applicant that online acceptance or binding cannot be completed presently; (4) alternately, if so, via the one or more processors and/or transceivers, electronically verifying prescription drug use for the applicant matches prescription drug use stated in their online or virtual application; (5) if so (i.e., if stated prescription drug use is verified, and there are no problematic or "kick out" prescription drugs being used by the applicant), then generating, via the one or more processors, an electronic message detailing disability insurance for the applicant; and/or (6) transmitting, via the one or more processors and/or transceivers, the electronic message to the applicant's mobile device (via wireless communication or data transmission over one or more radio links or wireless communication channels or networks) for their review and approval, and to facilitate providing binding disability insurance via an online customer channel to enhance the online customer experience.

The multiple kick out questions may relate to acquiring occupation information, and the method includes determining whether or not the applicant has an acceptable occupation or job, or an occupation that requires further inquiry. The multiple kick out questions may relate to acquiring height and weight information, and the method comprises determining whether or not the applicant has an acceptable body mass index (BMI), or a BMI that requires further inquiry. The multiple kick out questions may relate to acquiring disease information, and the method comprises determining whether or not the applicant has an acceptable disease, or a disease that requires further inquiry. The multiple kick out questions may relate to acquiring life style information, and the method comprises determining whether or not the applicant has an acceptable life style or a life style that contains no dangerous activities (e.g., downhill skiing, sky diving, scuba diving, etc.), or a life style that requires further inquiry.

The disability insurance may include a low amount of insurance (e.g., less than $3,000), and is bound online. The disability insurance may be for a limited amount of time (e.g., less than 3 or 6 months), and is bound online.

In another aspect, a computer-implemented method for real-time screening of an applicant for disability insurance may be provided. The computer-implemented method may include (1) receiving, via one or more processors and/or transceivers, a virtual or online application for disability insurance from a user mobile device (via wireless communication or data transmission over one or more radio links or wireless communication channels or networks), the virtual or online application including answers to multiple kick out questions, and an identifier for the applicant; (2) determining, via the one or more processors, whether or not the applicant's answers satisfy all of the multiple kick out questions; (3) if not, via the one or more processors and/or transceivers, transmitting a notification to the applicant's mobile device (via wireless communication or data transmission over one or more radio links or wireless communication channels or networks) notifying the applicant that online acceptance or binding cannot be completed presently; (4) alternately, if so, via the one or more processors and/or transceivers, electronically verifying the prescription drugs stated in the online or virtual application as being used by the applicant (if any) match (or otherwise only include) pre-approved prescription drugs; (5) if so (i.e., if there are no problematic or "kick out" prescription drugs being used by the applicant), then generating, via the one or more processors, an electronic message detailing disability insurance for the applicant (and/or generating an appropriate insurance based upon the answers to one or more of the multiple kick out questions); and/or (6) transmitting, via the one or more processors and/or transceivers, the electronic message to the applicant's mobile device (via wireless communication or data transmission over one or more radio links or wireless communication channels or networks) for the applicant's review and approval, and to facilitate providing binding disability insurance via an online customer channel to enhance the online customer experience.

In another aspect, a computer system configured to perform real-time screening of an applicant for disability insurance may be provided. The computer system may include one or more processors, transceivers, sensors, and/or servers configured to: (1) receive a virtual or online application for disability insurance from a user mobile device (via wireless communication or data transmission over one or more radio links or wireless communication channels or networks), the virtual or online application including answers to multiple kick out questions, and an identifier for the applicant; (2) determine whether or not the applicant's answers satisfy all of the multiple kick out questions; (3) if not, generate and transmit an electronic notification to the applicant's mobile device (via wireless communication or data transmission over one or more radio links or wireless communication channels or networks) notifying the applicant that online acceptance or binding cannot be completed presently; (4) alternately, if so, electronically verifying prescription drug use for the applicant matches prescription drug use stated in their online or virtual application; (5) if so (i.e., if stated prescription drug use is verified, and there are no problematic or "kick out" prescription drugs being used by the applicant), then generate an electronic message detailing disability insurance for the applicant; and/or (6) transmit the electronic message to the applicant's mobile device (via wireless communication or data transmission over one or more radio links or wireless communication channels or networks) for their review and approval, and to facilitate providing binding disability insurance via an online customer channel to enhance the online customer experience.

In another aspect, a computer system configured to perform real-time screening of an applicant for disability insurance, the computer system comprising one or more processors, sensors, servers, and/or transceivers configured to: (1) receive a virtual or online application for disability insurance from a user mobile device (via wireless communication or data transmission over one or more radio links or wireless communication channels or networks), the virtual or online application including answers to multiple kick out questions, and an identifier for the applicant; (2) determine whether or not the applicant's answers satisfy all of the multiple kick out questions; (3) if not, the generating and transmitting an electronic notification to the applicant's mobile device (via wireless communication or data transmission over one or more radio links or wireless communication channels or networks) notifying the applicant that online acceptance or binding cannot be completed presently; (4) alternately, if so, electronically verifying the prescription drugs stated in the online or virtual application as being used by the applicant (if any) match (or otherwise only include) pre-approved prescription drugs; (5) if so (i.e., if there are no problematic or "kick out" prescription drugs being used by the applicant), then generating an electronic message detailing disability insurance for the applicant (and/or generating an appropriate insurance based upon the answers to one or more of the multiple kick out questions); and/or (6) transmitting the electronic message to the applicant's mobile device (via wireless communication or data transmission over one or more radio links or wireless communication channels or networks) for the applicant's review and approval, and to facilitate providing binding disability insurance via an online customer channel to enhance the online customer experience.

The foregoing methods may include additional, less, or alternate actions, including those discussed elsewhere herein. The foregoing methods may be implemented via one or more local or remote processors, servers, sensors, and/or transceivers, and/or implemented via computer-executable instructions stored on non-transitory computer-readable media or medium. And the foregoing computer systems may include additional, less, or alternate functionality, including that discussed elsewhere herein.

VI. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor implemented. For example, at least some of the operations of a method may be performed by one or more processors or processor-implemented hardware modules. The performance of certain operations may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some exemplary embodiments, the one or more processors or processor implemented modules may be located in a single geographic location (e.g., within a home environment, an office environment, or a server farm). In other exemplary embodiments, the one or more processors or processor-implemented modules may be distributed across a number of geographic locations.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112, sixth paragraph.

The term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "benefit amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to property insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; pert insurance, personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" may be used interchangeably herein to refer to a person, party, or entity (e.g., a business or other organizational entity) that is covered by the insurance policy, e.g., whose insured article or entity (e.g., property, life, health, auto, home, business) is covered by the policy.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

We claim:

1. A computer-implemented method for real-time processing of request for a product, the computer-implemented method comprising the following performed by an electronic processing element:
   receiving via an electronic communications network, data associated with the request including information about an individual associated with the request;
   automatically calculating a body mass index number of the individual based upon the information about the individual;
   automatically rejecting the request if the body mass index of the individual is below a minimum threshold or above a maximum threshold;
   obtaining, via the electronic communications network, a prescription drug history of the individual stored in a database of a third-party information provider;
   automatically rejecting the request if the prescription drug history of the individual shows that the individual uses one or more specific drugs; and
   automatically transmitting real-time results of the processing to a mobile device of the individual over the electronic communications network via a transceiver in communication with the electronic processing element, the real-time results including one of an acceptance or a rejection of the request.

2. The computer-implemented method as set forth in claim 1, wherein the insurance product is disability insurance.

3. The computer-implemented method as set forth in claim 1, wherein the one or more specific drugs includes drugs used to treat serious medical conditions.

4. The computer-implemented method as set forth in claim 1, further including the electronic processing element confirming an occupation class assigned to the individual based upon an occupation of the individual, and basing a price for the product at least in part upon the confirmed assigned occupation class.

5. The computer-implemented method as set forth in claim 1, further including the electronic processing element obtaining a motor vehicle report for the individual, and automatically rejecting the request if the motor vehicle report for the individual shows that the individual engages in one or more specific unsafe driving behaviors.

6. The computer-implemented method as set forth in claim 1, further including the electronic processing element obtaining income and/or tax information for the individual, and considering the income and/or tax information when accepting or rejecting the request and/or setting a price for the product.

7. The computer-implemented method as set forth in claim 1, if the request is rejected, further including allowing the individual at least in some cases to request the product using an alternate non-real-time process.

8. A system for real-time processing of an request for a product, the system comprising:
   a transceiver coupled to an electronic communications network; and
   an electronic processing element coupled to the transceiver and configured to—
   receive via the transceiver, data associated with the request including information about an individual associated with the application,
   automatically calculate a body mass index number of the individual based upon the information about the individual,
   automatically reject the request if the body mass index of the individual is below a minimum threshold or above a maximum threshold,
   obtain, via the transceiver, a prescription drug history of the individual stored in a database of a third-party information provider,
   automatically reject the request if the prescription drug history of the individual shows that the individual uses one or more specific drugs, and
   automatically transmit real-time results of the processing to a mobile device of the individual over the electronic communications network via the transceiver, the real-time results including one of an acceptance or a rejection of the request.

9. The system as set forth in claim 8, wherein the product is disability insurance.

10. The system as set forth in claim 8, wherein the one or more specific drugs includes drugs used to treat serious medical conditions.

11. The system as set forth in claim 8, the electronic processing element further configured to confirm an occupation class assigned to the individual based upon an occupation of the individual, and to base a price for the product at least in part upon the confirmed assigned occupation class.

12. The system as set forth in claim 8, further including the electronic processing element obtaining income and/or tax information for the individual, and considering the income and/or tax information when accepting or rejecting the request and/or setting a price for the product.

13. The system as set forth in claim 8, wherein if the request is rejected, the individual at least in some cases is allowed to request the product using an alternate non-real-time process.

14. A non-transitory computer readable storage medium with a computer program stored thereon for real-time processing of a request for a product, wherein the computer program is configured to instruct an electronic processing element to perform actions comprising:
   receiving via an electronic communications network, data associated with the request including information about an individual associated with the request;
   automatically calculating a body mass index number of the individual based upon the information about the individual;
   automatically rejecting the request if the body mass index of the individual is below a minimum threshold or above a maximum threshold;
   obtaining, via the electronic communications network, a prescription drug history of the individual stored in a database of a third-party information provider;
   automatically rejecting the request if the prescription drug history of the individual shows that the individual uses one or more specific drugs; and
   automatically transmitting real-time results of the processing to a mobile device of the individual over the electronic communications network via a transceiver in communication with the electronic processing element, the real-time results including one of an acceptance or a rejection of the request.

15. The non-transitory computer readable storage medium as set forth in claim 14, wherein the product is disability insurance.

16. The non-transitory computer readable storage medium as set forth in claim 14, wherein the one or more specific drugs includes drugs used to treat serious medical conditions.

17. The non-transitory computer readable storage medium as set forth in claim 14, further including the electronic processing element confirming an occupation class assigned to the individual based upon an occupation of the individual, and basing a price for the product at least in part upon the confirmed assigned occupation class.

18. The non-transitory computer readable storage medium as set forth in claim 14, further including the electronic processing element obtaining income and/or tax information for the individual, and considering the income and/or tax information when accepting or rejecting the request and/or setting a price for the product.

19. The non-transitory computer readable storage medium as set forth in claim 14, if the request is rejected, further including allowing the individual at least in some cases to request the product using an alternate non-real-time process.

* * * * *